(12) United States Patent
Phillips et al.

(10) Patent No.: US 11,350,187 B2
(45) Date of Patent: May 31, 2022

(54) COMPACT MODULAR WIRELESS SENSOR

(71) Applicant: Watlow Electric Manufacturing Company, St. Louis, MO (US)

(72) Inventors: James Phillips, Lake Geneva, WI (US); Don Recupido, Crystal Lake, IL (US); Nathan Frost, McHenry, IL (US); Randy Scott Brown, Poplar Grove, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 16/987,551

(22) Filed: Aug. 7, 2020

(65) Prior Publication Data

US 2020/0366975 A1 Nov. 19, 2020

Related U.S. Application Data

(63) Continuation of application No. 15/932,252, filed on Feb. 16, 2018, now Pat. No. 10,743,088.

(60) Provisional application No. 62/459,698, filed on Feb. 16, 2017.

(51) Int. Cl.
*H04Q 9/00* (2006.01)
*H04B 1/38* (2015.01)

(52) U.S. Cl.
CPC .............. *H04Q 9/00* (2013.01); *H04B 1/38* (2013.01); *H04Q 2209/40* (2013.01)

(58) Field of Classification Search
CPC ...................... H04Q 9/00; H04B 1/38
See application file for complete search history.

(56) References Cited

U.S. PATENT DOCUMENTS

| 4,635,055 | A | * | 1/1987 | Fernandes | ............ | G01R 15/142 |
| | | | | | | 340/870.17 |
| 6,068,119 | A | * | 5/2000 | Derr | ....................... | G01D 11/24 |
| | | | | | | 206/305 |
| 6,888,453 | B2 | * | 5/2005 | Lutz | ....................... | G08C 19/00 |
| | | | | | | 340/506 |

(Continued)

FOREIGN PATENT DOCUMENTS

| CN | 101057149 | | 10/2007 |
| CN | 102460981 | A | 5/2012 |

(Continued)

*Primary Examiner* — Albert K Wong
(74) *Attorney, Agent, or Firm* — Burris Law, PLLC

(57) ABSTRACT

A sensor assembly includes a power source configured to store and output electrical power, a wireless communication component, a sensor, and a microprocessor electrically coupled to the power source, the wireless communication component, and the sensor. The microprocessor is configured to receive a startup command. In response to receiving the startup command, the microprocessor is configured to determine whether an amount of electrical power stored by the power source is sufficient to complete the startup command, receive the electrical power output by the power source during a first time period in response to the amount of power being sufficient to complete the startup command, and receive the electrical power output by the power source during a second time period in response to the amount of power being insufficient to complete the startup command, where the second time period is greater than the first time period.

19 Claims, 16 Drawing Sheets

(56) References Cited

U.S. PATENT DOCUMENTS

| | | | | |
|---|---|---|---|---|
| 7,007,541 | B2* | 3/2006 | Henry | G01D 3/022 |
| | | | | 73/19.1 |
| 7,075,442 | B2* | 7/2006 | Lion | G01K 1/024 |
| | | | | 340/540 |
| D560,185 | S | 1/2008 | Di et al. | |
| 7,639,041 | B1* | 12/2009 | Perisetty | H03K 19/0016 |
| | | | | 326/38 |
| 7,705,736 | B1* | 4/2010 | Kedziora | A01K 29/005 |
| | | | | 340/573.3 |
| 7,722,362 | B2 | 5/2010 | Frake et al. | |
| 7,954,621 | B2* | 6/2011 | Brandt | B65G 43/00 |
| | | | | 198/341.01 |
| 8,340,335 | B1* | 12/2012 | Shennib | H04R 25/604 |
| | | | | 381/328 |
| 8,543,345 | B1* | 9/2013 | Henry | G01N 27/286 |
| | | | | 702/64 |
| 8,898,369 | B1* | 11/2014 | Yang | G06F 1/3287 |
| | | | | 711/102 |
| 9,006,940 | B2* | 4/2015 | Korman | F24S 25/10 |
| | | | | 307/149 |
| 9,035,766 | B2* | 5/2015 | Worthington | G08B 29/14 |
| | | | | 340/539.22 |
| 9,064,389 | B1* | 6/2015 | Bernstein | G08C 17/02 |
| 9,817,673 | B2* | 11/2017 | Poornachandran | G06F 1/3212 |
| 10,743,088 | B2* | 8/2020 | Phillips | H04Q 9/00 |
| 2005/0024207 | A1* | 2/2005 | Schebel | G08B 13/08 |
| | | | | 340/545.2 |
| 2006/0267731 | A1* | 11/2006 | Chen | G06Q 10/10 |
| | | | | 340/10.1 |
| 2007/0044145 | A1 | 2/2007 | Kurian et al. | |
| 2008/0248779 | A1* | 10/2008 | Tsui | H02J 7/32 |
| | | | | 455/408 |
| 2009/0058663 | A1* | 3/2009 | Joshi | H04L 67/12 |
| | | | | 340/584 |
| 2011/0022826 | A1* | 1/2011 | More | G06F 1/26 |
| | | | | 713/1 |
| 2012/0056631 | A1* | 3/2012 | Feddes | A61B 5/25 |
| | | | | 324/686 |
| 2012/0135696 | A1* | 5/2012 | Lerzer | H04W 52/0277 |
| | | | | 455/127.1 |
| 2012/0152028 | A1* | 6/2012 | Ko | B60C 23/0411 |
| | | | | 73/753 |
| 2012/0244848 | A1* | 9/2012 | Ghaffari | H04M 1/72412 |
| | | | | 455/415 |
| 2012/0261109 | A1* | 10/2012 | Warren | F24F 11/30 |
| | | | | 165/201 |
| 2013/0211761 | A1* | 8/2013 | Brandsma | G01D 21/00 |
| | | | | 702/85 |
| 2014/0200840 | A1* | 7/2014 | Cox | G01D 18/00 |
| | | | | 702/104 |
| 2014/0219051 | A1 | 8/2014 | Pavel | |
| 2014/0252962 | A1* | 9/2014 | Chen | H05B 47/19 |
| | | | | 315/152 |
| 2014/0357949 | A1* | 12/2014 | Wilson | A61B 1/00032 |
| | | | | 600/109 |
| 2014/0375274 | A1* | 12/2014 | Tsai | G08C 17/02 |
| | | | | 320/137 |
| 2015/0219903 | A1* | 8/2015 | Chien | G03B 21/2033 |
| | | | | 353/1 |
| 2016/0095060 | A1* | 3/2016 | Seddighrad | H04W 4/80 |
| | | | | 370/311 |
| 2016/0116974 | A1* | 4/2016 | Ginnela | G06F 9/4401 |
| | | | | 713/2 |
| 2016/0337152 | A1* | 11/2016 | Masui | H03G 3/3042 |
| 2017/0090537 | A1* | 3/2017 | Elad | H02J 7/00034 |
| 2017/0288472 | A1* | 10/2017 | Stouter | H04B 5/0031 |
| 2018/0010935 | A1* | 1/2018 | Arnott | G01D 18/008 |
| 2018/0132748 | A1 | 5/2018 | Perkins et al. | |
| 2018/0175905 | A1* | 6/2018 | Nabki | H04L 7/00 |
| 2019/0064861 | A1* | 2/2019 | Sato | H02J 50/30 |
| 2019/0215030 | A1* | 7/2019 | Nabki | H04B 1/10 |
| 2021/0175753 | A1* | 6/2021 | La Rosa | H02J 50/27 |
| 2021/0342660 | A1* | 11/2021 | Wu | G06K 19/0715 |

FOREIGN PATENT DOCUMENTS

| | | |
|---|---|---|
| CN | 102620852 | 8/2012 |
| CN | 102620852 A | 8/2012 |
| CN | 102662081 | 9/2012 |
| CN | 104105437 A | 10/2014 |
| CN | 104807580 | 7/2015 |
| JP | 2001336904 | 12/2001 |
| JP | 2009507284 | 2/2009 |
| JP | 2016027445 | 2/2016 |
| KR | 1020180062837 | 6/2018 |
| TW | 201736805 | 10/2017 |
| WO | 2011135886 | 11/2011 |
| WO | 2018151805 | 8/2018 |

* cited by examiner

COMPACT MODULAR WIRELESS SENSOR

CROSS-REFERENCE TO RELATED APPLICATIONS

This application is a continuation of U.S. application Ser. No. 15/932,252, filed on Feb. 16, 2018, which claims priority to and the benefit of U.S. Provisional Application Ser. No. 62/459,698, filed on Feb. 16, 2017. The contents of these applications are incorporated herein by reference in their entireties.

FIELD

The present disclosure relates generally to sensor assemblies, and more particularly to wireless sensor assemblies.

BACKGROUND

The statements in this section merely provide background information related to the present disclosure and may not constitute prior art.

Sensors are used in a wide variety of operational environments to monitor operating and environmental characteristics. These sensors can include temperature, pressure, velocity, position, motion, current, voltage, and impedance sensors, by way of example. The sensors are placed in operational environment being monitored and are designed to generate an electrical signal or have a change in the electrical characteristics in response to a change in the monitored operating or environment characteristic. The change in the electrical characteristics in the sensors may be a change in impedance, voltage or current.

A sensor typically includes a probe and a processing unit. The probe acquires data from the environment and transmits the data to the processing unit, which, in turn, determines the measurements and provides a reading to a user. The processing unit generally requires a significant amount of power from a power source during data processing. The power source may be an integrated battery or may be an external power source connected to the sensor by wires. The sensor cannot be made small with the integrated battery and the processing unit. When the sensor is connected to an external power source by wires, it is difficult to use the sensor in harsh environment or to properly mount the sensor to an apparatus with complicated structure.

Although some known processing units include low-power microprocessors, these microprocessors consume a high amount of power during startup. In some applications where energy harvesting is important, the initial amount of power consumed at startup by the low-power microprocessors can drain an excessive amount of energy and cause a startup failure.

These issues with power consumption and harvesting, among other issues with the operation of electronic sensors, is addressed by the present disclosure.

SUMMARY

The present disclosure provides a sensor assembly that includes a power source configured to store and output electrical power, a wireless communication component configured to receive electrical power from the power source, a sensor, and a microprocessor electrically coupled to the power source, the wireless communication component, and the sensor. The microprocessor is configured to receive a startup command. In response to receiving the startup command, the microprocessor is configured to determine whether an amount of electrical power stored by the power source is sufficient to complete the startup command, receive an electrical power output from the power source during a first time period in response to the amount of electrical power being sufficient to complete the startup command, and receive the electrical power output from the power source during a second time period in response to the amount of electrical power being insufficient to complete the startup command, where the second time period is greater than the first time period.

In some forms, the microprocessor is configured to, in response to one of the first time period and the second time period elapsing: obtain data from the sensor, and transmit, using the wireless communication component, the data obtained from the sensor to an external device at a given transmittal rate, where the given transmittal rate is based on amount of power stored in the power source.

In some forms, the given transmittal rate is based on a clock of the microprocessor.

In some forms, the power source is a battery, and the given transmittal rate is a function of a battery life of the battery.

In some forms, receiving the electrical power output by the power source during the second time period further includes receiving the electrical power output from the power source in response to a delay time period elapsing.

In some forms, the delay time period is controlled by at least one of the microprocessor and an external delay element.

In some forms, the sensor is at least one of a temperature sensor, a pressure sensor, a gas sensor, and an optical sensor.

In some forms, the power source includes one of a self-powering device and a thermoelectric device.

In some forms, the self-powering device is a vibration device.

In some forms, the wireless communication component includes one of a Bluetooth module, a WiFi module, and a LiFi module.

In some forms, the sensor further includes a housing, and the power source, wireless communication component, and the microprocessor are disposed within the housing.

In some forms, the housing defines a volume of less than 2 in$^3$.

The present disclosure provides a low-power wireless sensor system including a plurality of sensor assemblies. Each sensor assembly includes a power source configured to store and output electrical power, a wireless communication component, a sensor, and a microprocessor electrically coupled to the power source, the wireless communication component, and the sensor. The microprocessor is configured to receive a startup command. In response to receiving the startup command, the microprocessor is configured to determine whether an amount of electrical power stored by the power source is sufficient to complete the startup command, receive the electrical power output by the power source during a first time period in response to the amount of electrical power being sufficient to complete the startup command, and receive the electrical power output by the power source during a second time period in response to the amount of electrical power being insufficient to complete the startup command, where the second time period is greater than the first time period. The low-power wireless sensor system includes a wireless network operatively connecting each of the sensor assemblies and configured to transmit and receive data between each of the sensor assemblies.

The present disclosure provides a method for operating a sensor assembly having a power source, a wireless communication component, a sensor, and a microprocessor. The method includes determining whether an amount of electrical power stored by the power source is sufficient to complete a startup command. The method includes receiving the electrical power from the power source during a first time period in response to the amount of electrical power being sufficient to complete the startup command. The method includes receiving the electrical power from the power source during a second time period in response to the amount of electrical power being insufficient to complete the startup command, where the second time period is greater than the first time period.

In some forms, in response to one of the first time period and the second time period elapsing, the method further includes: obtaining data from the sensor, and transmitting, using the wireless communication component, the data obtained from the sensor to an external device at a given transmittal rate, where the given transmittal rate is based on amount of power stored in the power source.

In some forms, the given transmittal rate is based on a clock of the microprocessor.

In some forms, the power source is a battery, and where the given transmittal rate is a function of a battery life of the battery.

In some forms, receiving the electrical power output by the power source during the second time period further includes receiving the electrical power output by the power source in response to a delay time period elapsing.

In some forms, the method further includes controlling the delay time period using at least one of the microprocessor and an external delay element.

The present disclosure provides a sensor assembly including a power source configured to store and output electrical power and a wireless communication component configured to transmit data to an external device and receive power from the power source, where the wireless communication component has a power consumption of less than or equal to 0.5 mW. The sensor assembly includes a sensor and a microprocessor electrically coupled to the power source, the wireless communication component, and the sensor. The microprocessor is configured to receive a startup command. In response to receiving the startup command, the microprocessor is configured to determine whether an amount of electrical power stored by the power source is sufficient to complete the startup command, receive the electrical power output by the power source during a first time period in response to the amount of electrical power being sufficient to complete the startup command, and receive the electrical power output by the power source during a second time period in response to the amount of electrical power being insufficient to complete the startup command, wherein the second time period is greater than the first time period. The microprocessor is configured to, in response to one of the first time period and the second time period elapsing, obtain data from the sensor and transmit the data to the external device at a given transmittal rate via the wireless communication component, wherein the given transmittal rate is based on amount of power stored in the power source. The sensor assembly includes a housing defining an interior space, where the power source, wireless communication component, and the microprocessor are disposed within the interior space of the housing, and the housing defines a volume of less than 2 in$^3$.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

First Form

Figure 1:
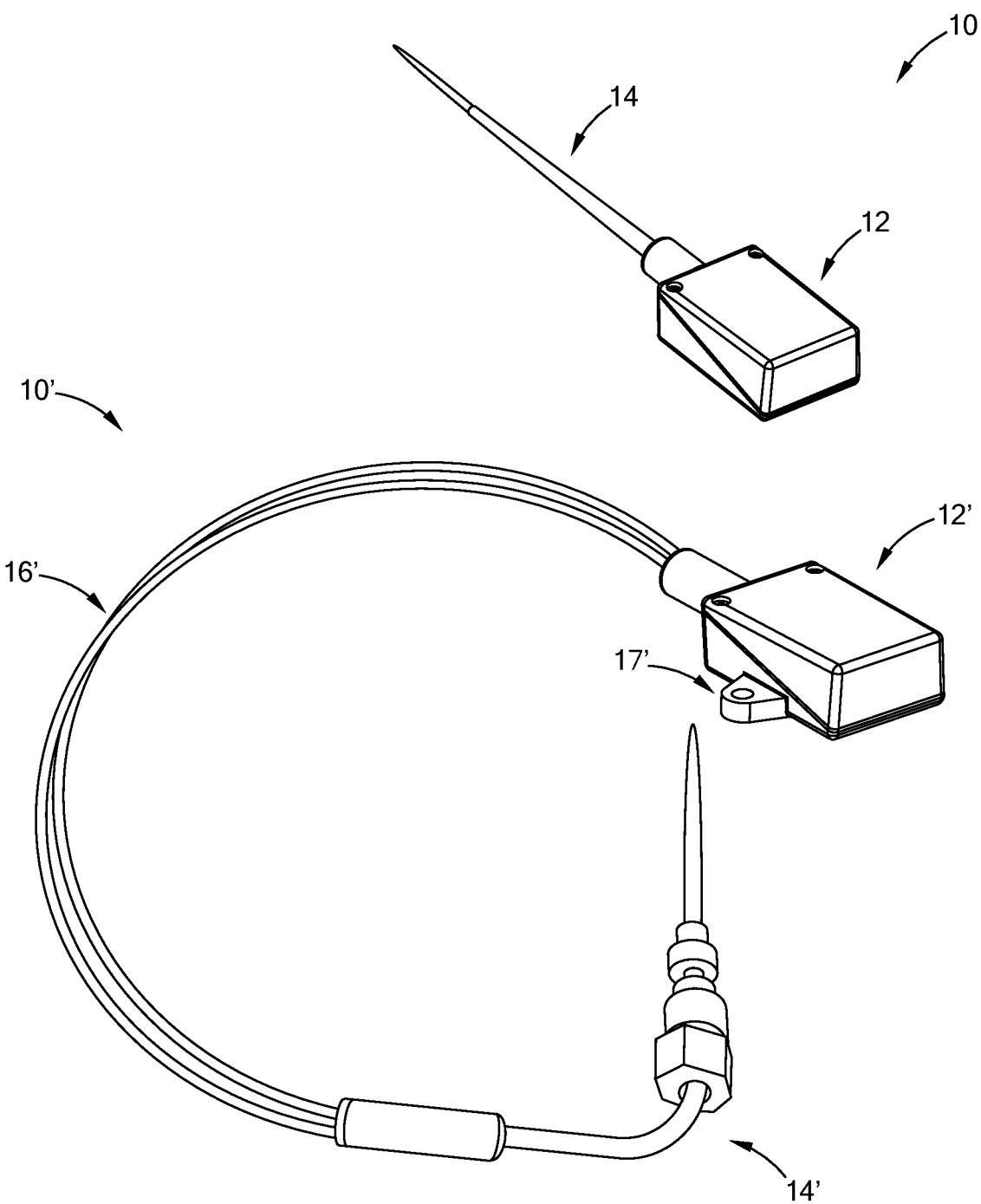
FIG. 1 is a perspective view of two wireless sensor assemblies constructed in accordance with the present disclosure.

Referring to FIG. 1, a wireless sensor assembly 10 constructed in accordance with a first form of the present disclosure generally includes a housing 12 and a sensor 14. The sensor 14 may be inserted into an aperture (not shown in FIG. 1) and connected to electrical and electronic components inside the housing 12. Alternatively, a wireless sensor assembly 10' according to a variant of the first form may include a housing 12', a sensor 14', and wires 16' that connect the sensor 14' to the electrical and electronic components inside the housing 12'. The housing 12' may further include a pair of tabs 17' for mounting the housing 12' to an adjacent mounting structure (not shown). The sensor 14 or 14' may be a temperature sensor, a pressure sensor, a gas sensor, and an optical sensor, by way of example.

Figure 2:
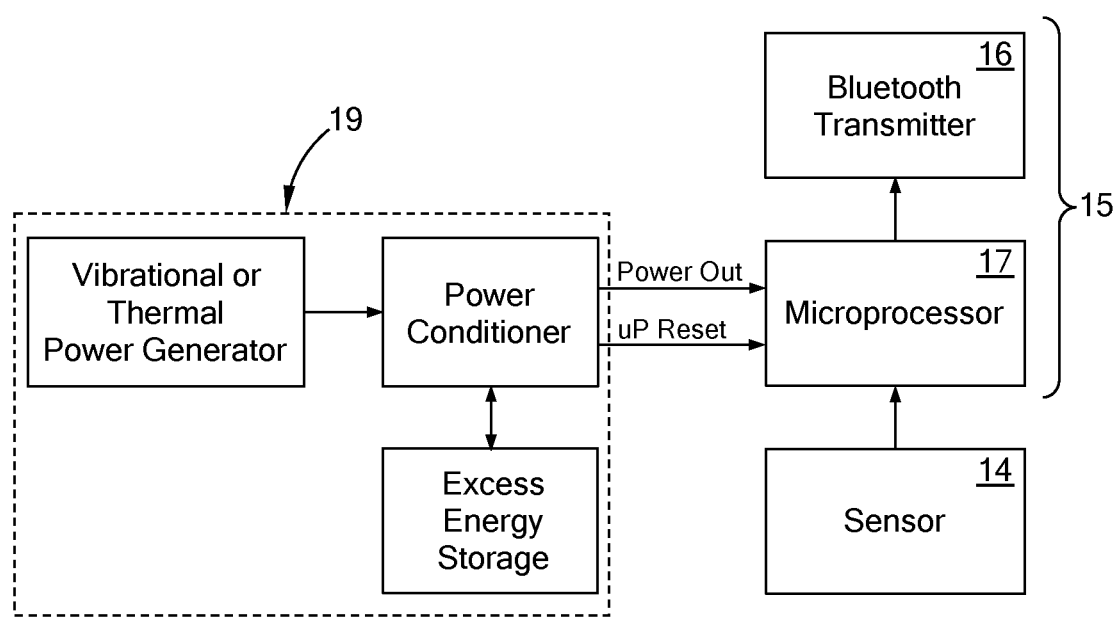
FIG. 2 is a schematic diagram of electronics and one form of a wireless power source in accordance with the teachings of the present disclosure.

Referring to FIG. 2, exemplary electronic components inside the housing 12/12', among other components, are shown in schematic form. The electronics 15 generally include a wireless communications component 16, which in this form is shown as a Bluetooth® RF Transmitter, and firmware 17 configured to manage a rate of data transmittal from the wireless communications component 16 to an external device (not shown). The firmware 17 resides in the microprocessor in this form. As further shown, a power source 19 provides power to the electronics 15. The power source 19 may take on any number of forms, including a battery as described in greater detail below. In this form, the power source 19 includes an "energy harvesting" configuration, which includes a vibrational or thermal power generator (described in greater detail below), a power conditioner, and a storage component to store excess energy.

The firmware 17 may also be configured to manage power consumed at initial startup of the microprocessor. Low-power microprocessors typically consume an initial large burst of power on the order of 1 second or less during startup before entering true low-power mode. In an energy harvesting application dependent on a low-power mode of the microprocessor to function properly, the initial startup power burst may prove insurmountable, draining the stored energy before the initial power burst is over, causing startup failure. To address this issue of an initial startup surge, the firmware 17 may be modified to spread out the initial energy burst over time such that an average power consumption is within the capability of the energy harvesting configuration. Although this spreading out of energy over time will delay startup of the microprocessor, the stored energy will not be drained, thus inhibiting a startup failure.

In another form, additional circuitry may be added to the microprocessor to delay the output logic signal from asserting until there is enough stored energy on the storage device such that the energy harvesting components/module can get through the initial power surge. This may take the form of an external delay element or be a part of the microprocessor with a power conditioning chip. In one form, when there is ample vibrational or thermal energy available, startup can begin without spreading burst of energy, whereas with little vibrational or thermal energy present, the energy bursts can be spread over time. In other words, the electronics may be configured to delay an output logic signal from asserting until there is sufficient stored energy to sustain an initial power surge. These and other data management functions within the processor and firmware 17 are described in greater detail below.

Figure 3:
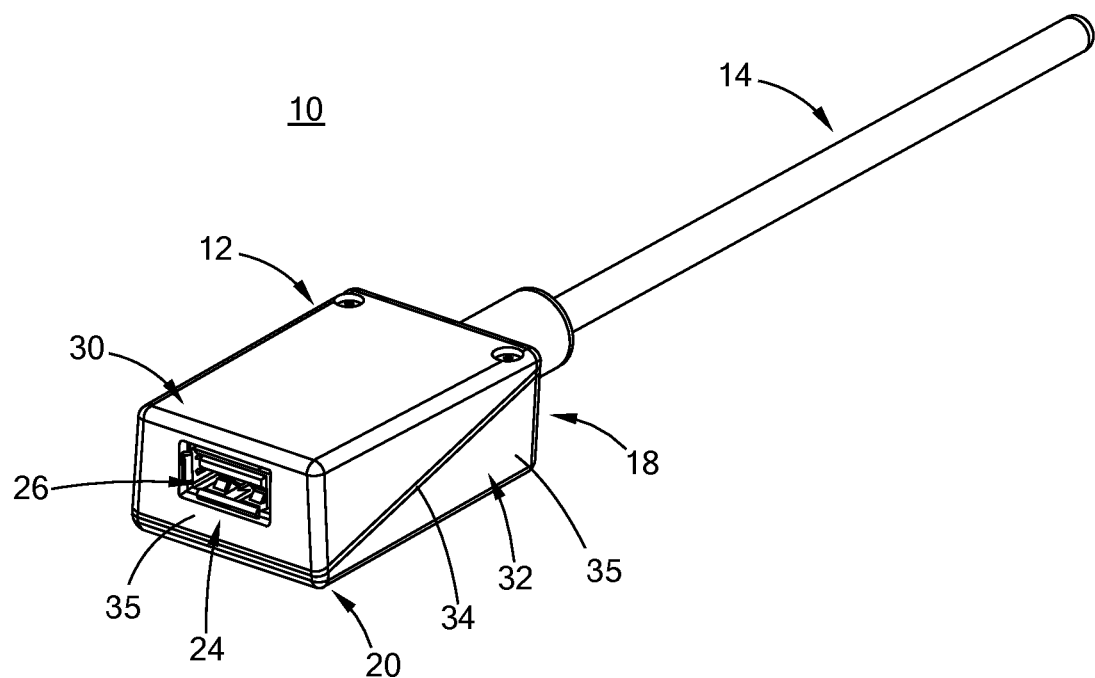
FIG. 3 is another perspective view of the wireless sensor assembly of the first form.
Figure 4:
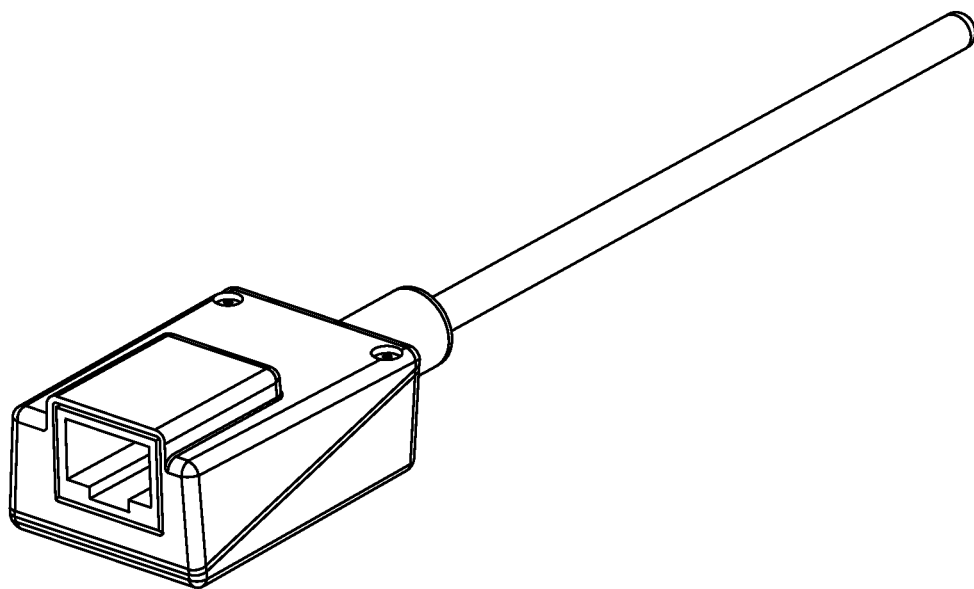
FIG. 4 is another variant of a wireless sensor assembly of the first form.
Figure 5:
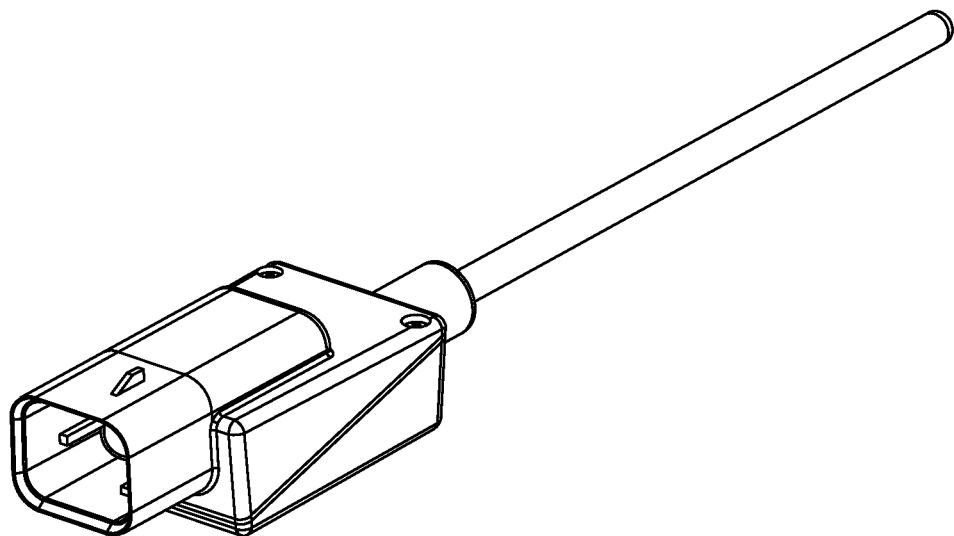
FIG. 5 is still another variant of a wireless sensor assembly of the first form.

Referring to FIG. 3, the housing 12 has opposing first and second ends 18 and 20, defining a first aperture 22 (shown in FIG. 6) and a second aperture 24, respectively. The sensor 14 has a longitudinal end inserted into the first aperture 22 and connected to the electrical and electronic components mounted within the housing 12. A communication connector 26 is disposed in the second aperture 24 and is configured to receive a mating communication connector (not shown). The second aperture 24 and the communication connector 26 may be configured differently depending on the type of the mating communication connector to be connected. For example, the communication connector 26 may be configured to form a Universal Serial Bus (USB) port (FIG. 3), a USB-C port, an Ethernet port (FIG. 4), a Controller Area Network (CAN) bus port (FIG. 5) and Aspirated TIP/ Ethernet port, among others. The outer profile of the housing 12 may be configured accordingly to accommodate the shape of the communication connector 26. The mating communication connector is optional and may be used to transmit raw sensing data acquired by the sensor 14, through a network, to an external or remote device (not shown) for further processing. Alternatively, the raw sensing data acquired by the sensor 14 may be transmitted to the external device or remote device wirelessly, which will be described in more detail below.

As further shown in FIG. 3, the housing 12 includes an upper portion 30 and a lower portion 32, each of the portions defining mating wedges that accommodate internal components and external features at opposing ends 18, 20. The lower portion 32 of the housing 12 may define the first aperture 22, whereas the upper portion 30 of the housing 12 may define the second aperture 24, or vice versa. The mating wedges of the upper portion 30 and the lower portion 32 define a sealing interface 34 along opposed lateral sidewalls 35. The sealing interface 34 between the upper and lower portions 30, 32 is angled so that the first aperture 22 is defined solely by the lower portion 32 (or alternatively by the upper portion 30), rather than jointly by the upper and lower portions 30, 32. As such, sealing of the sensor 14 to the housing 12 can be made relatively easy since the sensor 14 is sealed to only the lower portion 32, as opposed to multiple pieces (i.e., both the upper portion 30 and the lower portion 32).

Figure 6:
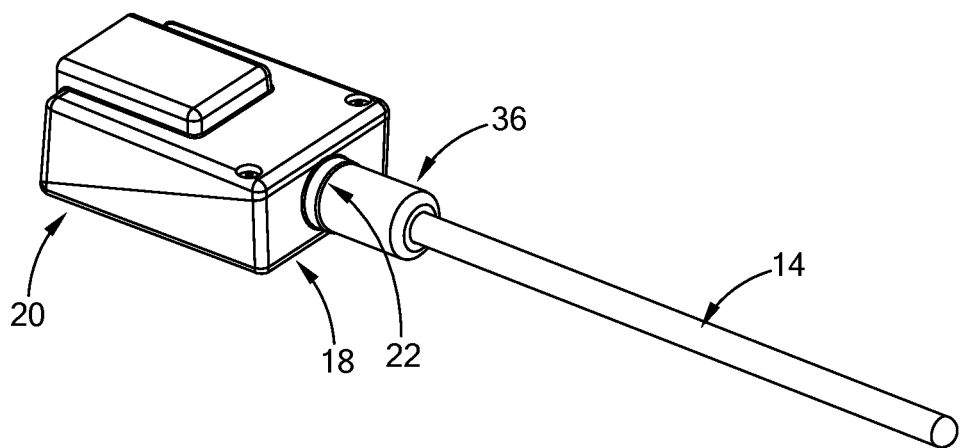
FIG. 6 is another perspective view of the wireless sensor assembly of FIG. 4.
Figure 7:
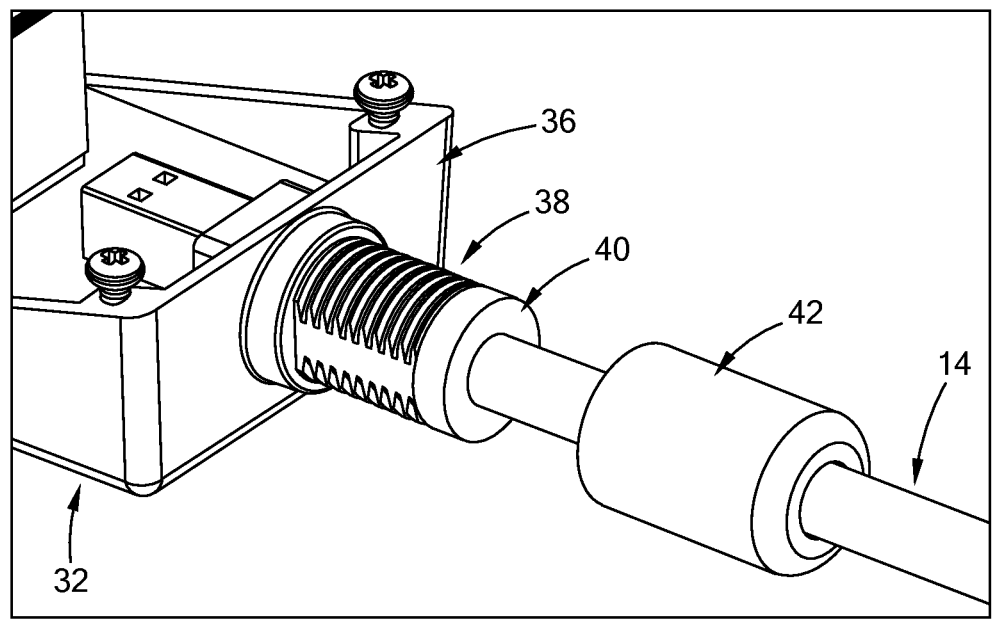
FIG. 7 is a partial detailed view of the wireless sensor assembly of the first form, showing components inside the housing.

Referring to FIGS. 6 and 7, the wireless sensor assembly 10 further includes a mounting assembly 36 for mounting the sensor 14 to the housing 12. The mounting assembly 36 includes a boss 38, a compression seal 40 at a free end of the boss 38, and a nut 42. The sensor 14 is inserted through the boss 38, the compression seal 40 and the nut 42. By securing the nut 42 around the boss 38 and the compression seal 40, the sensor 14 is secured and sealed to the housing 12. The nut 42 may be secured to the boss 38 via threaded connection, press-fit connection or push-on connection. The boss 38 may be a separate component that is inserted into the first aperture 22 or may be formed as an integral part of the lower portion 32 of the housing 12.

Figure 8:
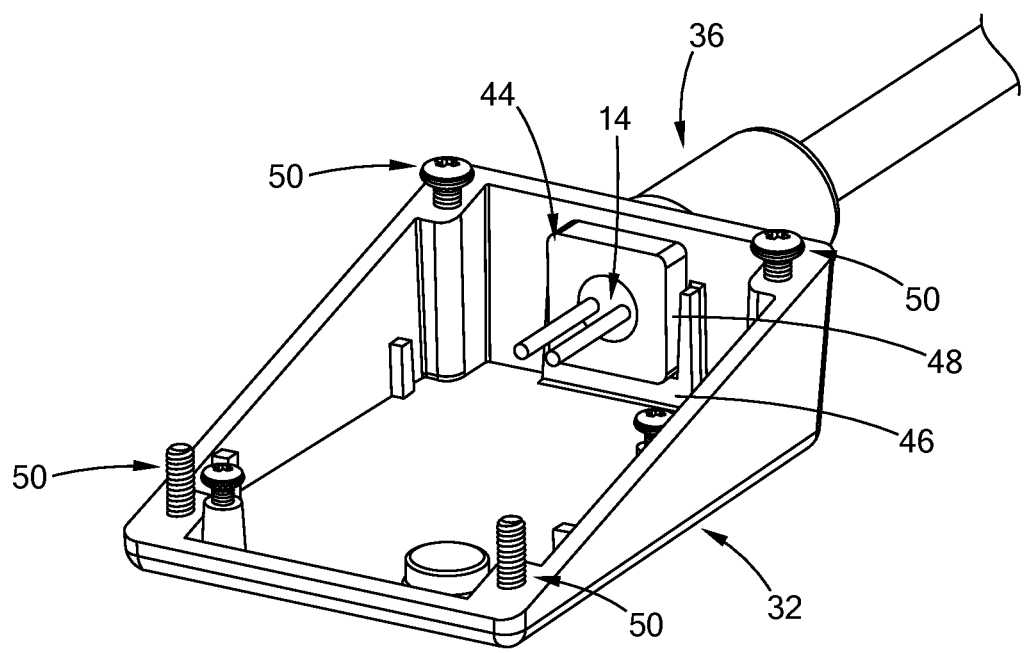
FIG. 8 is a top perspective of a lower portion of a housing of the wireless sensor assembly of the first form, with a sensor connected to the lower portion of the housing.

Referring to FIG. 8, the wireless sensor assembly 10 further includes an anti-rotation mechanism 44 disposed inside the housing 12, particularly in the lower portion 32 to prevent the sensor 14 from rotating when the sensor 14 is subjected to vibration. The anti-rotation mechanism 44 includes a U-shaped seat 46 protruding from an interior surface of the lower portion 32, and an anti-rotation nut 48 disposed in the seat 46.

The wireless sensor assembly 10 further includes securing features 50 for securing the lower portion 32 to the upper portion 30. The securing features 50 may be screws and holes as shown in FIG. 8. Alternatively, the upper and lower portions 30 and 32 may be secured by vibration welding, snap-fit, or any other joining methods known in the art. The upper and lower portions 30 and 32 may also include alignment features for aligning the upper and lower portions 30 and 32 during assembly.

Figure 9:
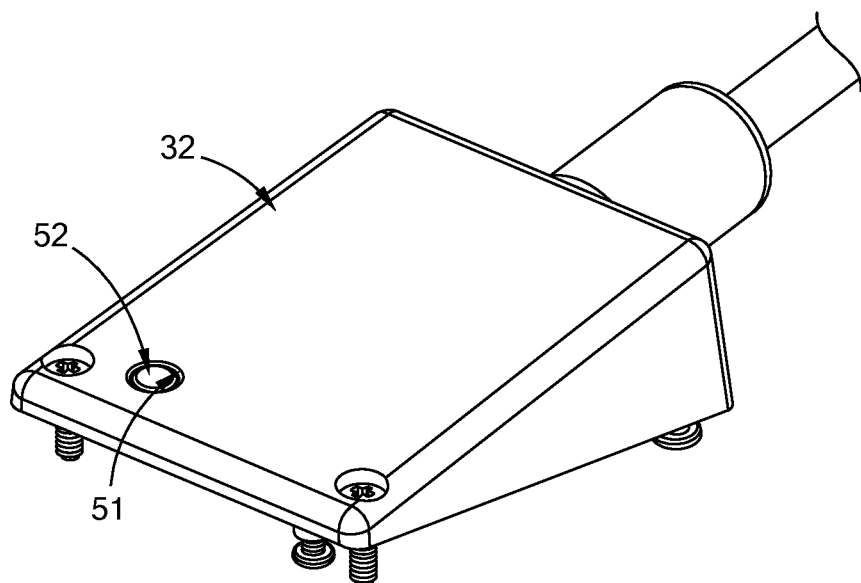
FIG. 9 is a bottom perspective view of a lower portion of a housing of the wireless sensor assembly of the first form, with a sensor connected to the lower portion of the housing.

Referring to FIG. 9, the lower portion 32 may further include a recess 51 defined in a bottom surface and a magnet 52 received in the recess 51. The external magnet 52 is operable for communication with the electrical and electronic components inside the housing 12 to disable and enable the sensor 14. The magnet 52 may be used to open a reed switch disposed inside the housing 12 during shipping to disable the sensor 14 and preserve battery life if a battery is provided inside the housing 12. During shipment, a small piece of adhesive tape may be placed over the magnet 52. To make the sensor 14 operable, the adhesive tape and the magnet 52 may be removed to allow for power supply from the battery to the sensor 14. The electrical and electronic components may include a latching circuitry to prevent the sensor 14 from be disabled if it were to encounter a strong magnetic field again. In addition, the recessed area around the recess 51 may serve as a "light pipe" for an indicator LED that can be used to show the functional status of the sensor 14. The plastic housing material in this area may be made thinner than other parts of the housing 12 to allow the indicator LED to be seen through the plastic housing material.

Figure 10:
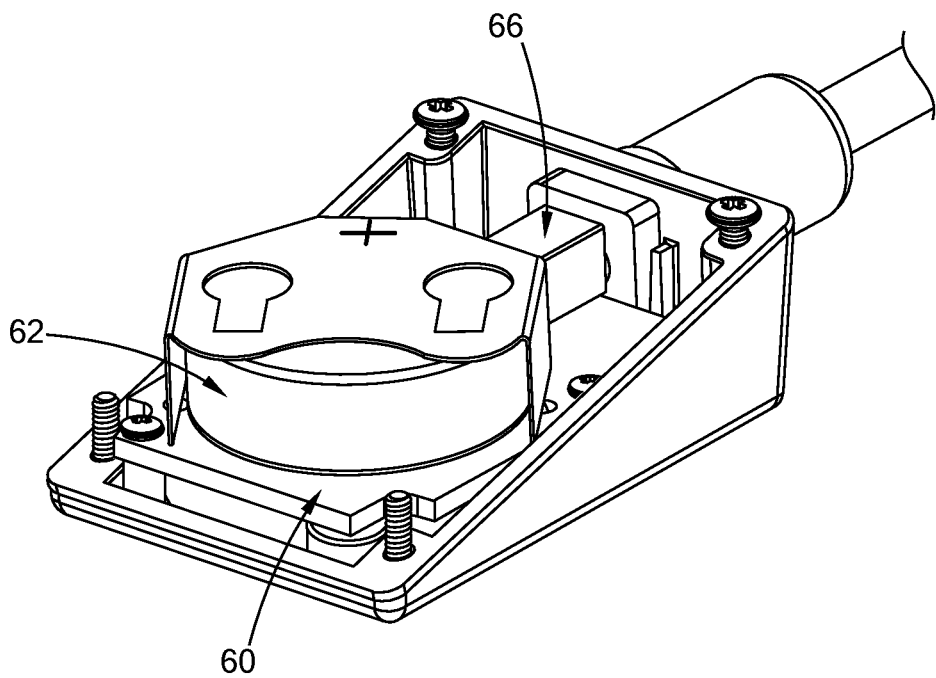
FIG. 10 is a perspective view of the wireless sensor assembly of the first form, with an upper portion of a housing removed to show components inside the housing.
Figure 11:
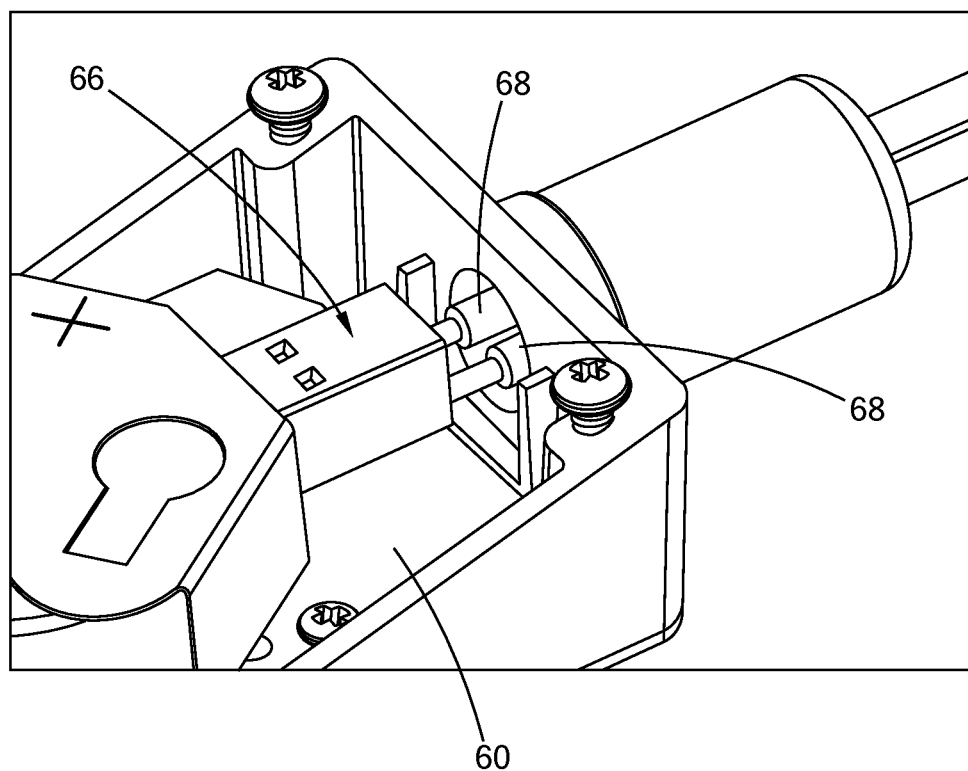
FIG. 11 is a partial enlarged view of FIG. 10.
Figure 12:
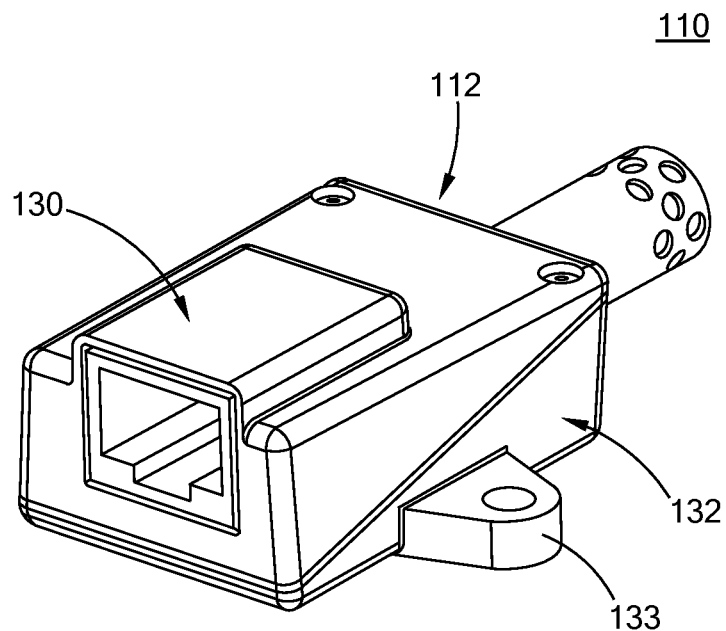
FIG. 12 is a perspective view of a wireless sensor assembly constructed in accordance with a second form of the present disclosure.
Figure 13:
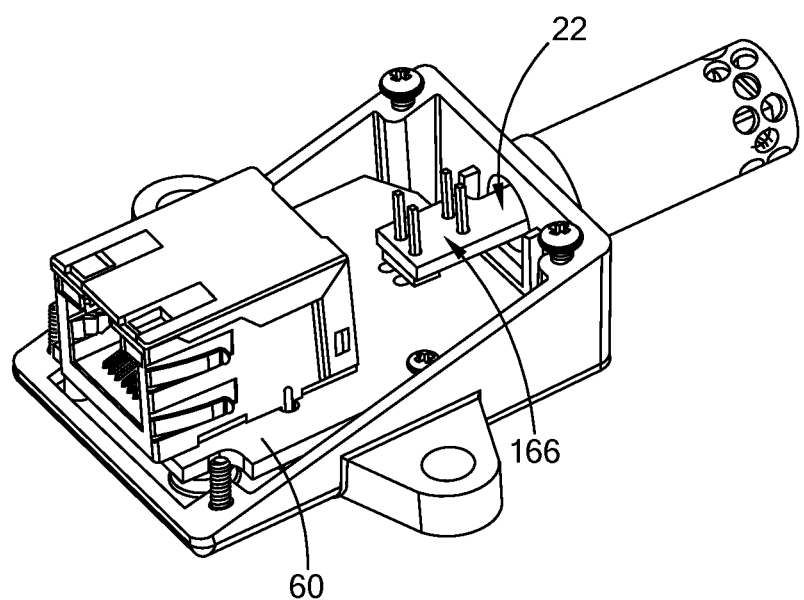
FIG. 13 is a perspective view of a wireless sensor assembly of a second form, with an upper portion of a housing removed to show components inside the housing.
Figure 14:
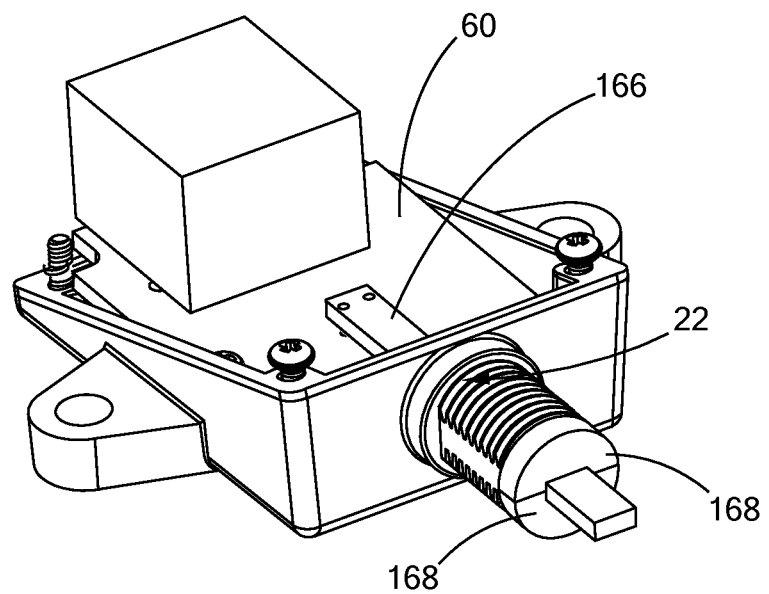
FIG. 14 is another perspective view of a wireless sensor assembly of a second form, with an upper portion of a housing removed to show components inside the housing.

Referring to FIGS. 10 and 11, the wireless sensor assembly 10 includes electrical and electronic components disposed in an interior space defined by the housing 12 and connected to the sensor 14 and the communication connector 26 (shown in FIG. 3). The electrical and electronic components may include a communication board 60, a wireless power source 62, a wireless communications component, firmware (not shown), and a sensor connector 66 for connecting the sensor 14 to the communication board 60. The communication board 60 is a printed circuit board. The wireless power source 62, the wireless communications component, and the firmware are mounted on the communication board 60.

Signals from the sensor 14 are transmitted to the communication board 60 via the sensor connector 66. As clearly shown in FIG. 11, the wires 68 of the sensor 14 are directly connected to the sensor connector 66, which is mounted on the communication board 60. The wireless communications component on the communications board 60 sends data to the external device (i.e., an external processing device) for data processing. The external device performs functions of data logging, computations, or re-transmitting the data to another remote device for further processing. The sensor 14 only collects raw data and transmits the raw data to the external or remote device before going to sleep. All sensing calculations, calibration adjustments, error checking, etc., are performed on the external or remote device so as not to use up any stored energy in the wireless power source 62 disposed within the housing 12. As such, the battery life can be conserved.

The electrical and electronic components within the housing 12 are configured to receive power from the wireless power source 62 and to be in electrical communication with the sensor 14. The wireless communications component has a power consumption less than about 0.5 mW. The electrical and electronic components disposed within the housing 12 are powered exclusively by the wireless power source 62. The wireless power source 62 may be a battery or a self-powering device, among others. The self-powering device may be a thermoelectric device or a vibration device comprising a piezo-electric device mounted to a cantilevered board.

In one form, the wireless sensor assembly 10 defines a volume less than about 2 in$^3$. The wireless communications component is configured to transmit raw data from the sensor 14 to an external or remote device, such as a tablet, a smartphone, a personal computer, a cloud computer center, or any processing device that can process the data transmitted from the wireless communications component. The wireless communications component is selected from the group consisting of a Bluetooth module, a WiFi module, and a LiFi module. The firmware is configured to manage a rate of data transmitted from the wireless communications component to the external or remote device. The firmware controls a rate of data transmitted from the wireless communications component as a function of battery life. The firmware also controls a processor clock to conserve power for the wireless power source. The firmware further monitors stored energy in the wireless power source 62 and adjusts a rate of data transmission from the wireless communications component as a function of an amount of stored energy. This may be analogous to a low power mode in order to preserve stored energy. As such, the battery life may be conserved and besides, the sensor 14 may be prevented from being turned off due to loss of power or at least being delayed. The rate of data transmission may return to a predetermined normal rate until more thermal or vibration energy is available to recharge the wireless power source 62.

Second Form

Referring to FIGS. 12 to 15, a wireless sensor assembly 110 in accordance with a second form of the present disclosure has a structure similar to that of the wireless sensor assembly 10 of the first form except for the structure of the housing and the sensor. Like components will be indicated by like reference numerals and the detailed description thereof is omitted herein for clarity.

Figure 15:
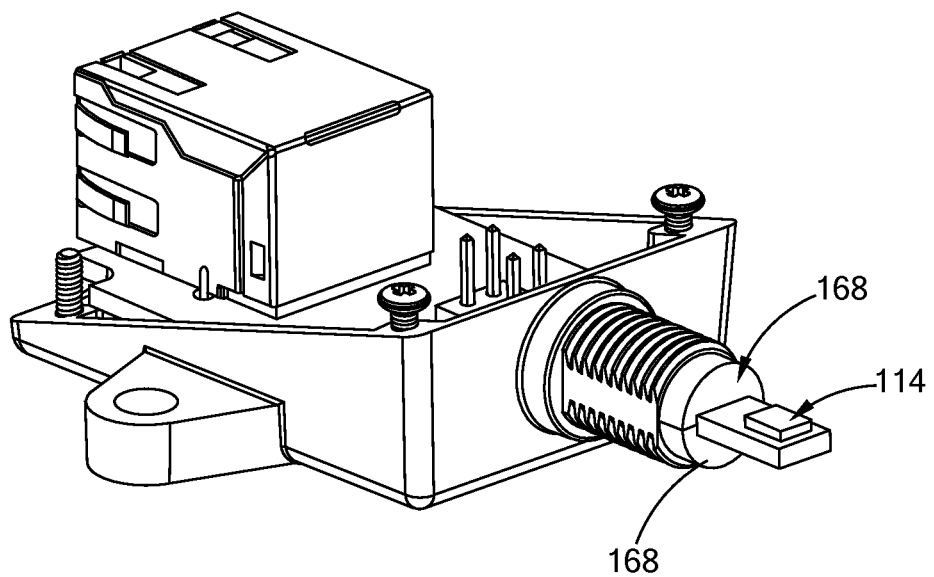
FIG. 15 is still another perspective view of a wireless sensor assembly of a second form, with an upper portion of a housing removed to show components inside the housing.

More specifically, the wireless sensor assembly 110 includes a housing 112 and a sensor 114 (shown in FIG. 15). The housing 112 includes an upper portion 130 and a lower portion 132. The lower portion 132 includes a pair of tabs 133 for mounting the housing 112 to an adjacent mounting structure. The sensor 114 is a board mount sensor. The electrical and electronic components received inside the housing 112 include a communication board 60 and a daughter board 166 mounted on the communication board 60. The board mount sensor 114 is also mounted on the daughter board 166. The daughter board 166 extends through the first aperture 22, with one end extending outside the housing 112 and another end extending inside the housing 112. Signals from the sensor 114 are transmitted to the communication board 60 via a daughter board 166. The daughter board 166 is supported by a pair of rubber gaskets 168. The pair of gaskets 168 also provide a compression seal between the daughter board 166 and the lower portion 132 of the housing 112.

Third Form

Figure 16:
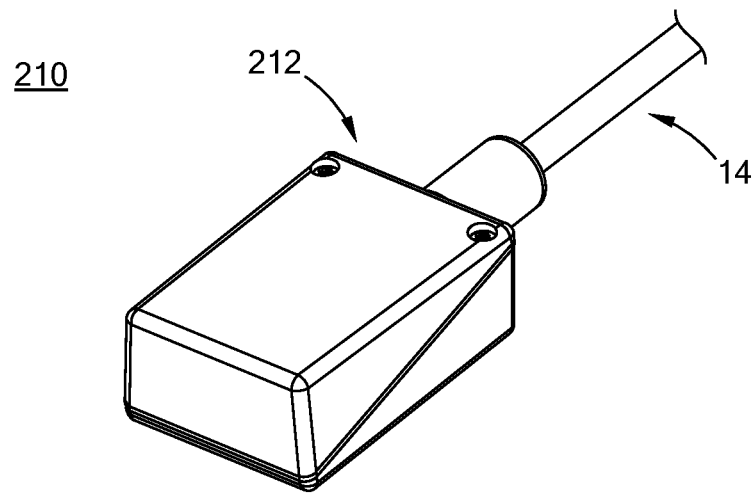
FIG. 16 is a perspective view of a wireless sensor assembly constructed in accordance with a third form of the present disclosure.

Referring to FIG. 16, a wireless sensor assembly 210 constructed in accordance with a third form of the present disclosure generally includes a housing 212 having a structure similar to that of the housing 12 of the first form, except that no second aperture is defined in the housing 212 to receive a communication connector to form a communication port. Like the wireless sensor assemblies 10 and 110 of the first and second forms, the wireless sensor assembly 210 includes similar electrical and electronics components for wireless communications with an external or remote device and for transmitting the raw data from the sensor 14, 114 to the external or remote device. As such, no communication port is necessary.

Fourth Form

Figure 17:
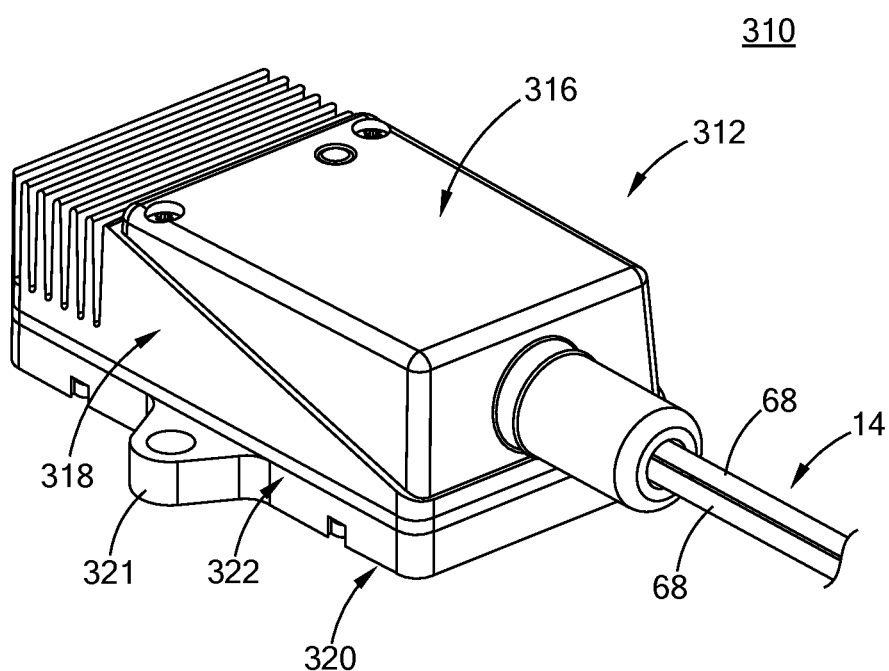
FIG. 17 is a perspective view of a wireless sensor assembly constructed in accordance with a fourth form of the present disclosure.
Figure 18:
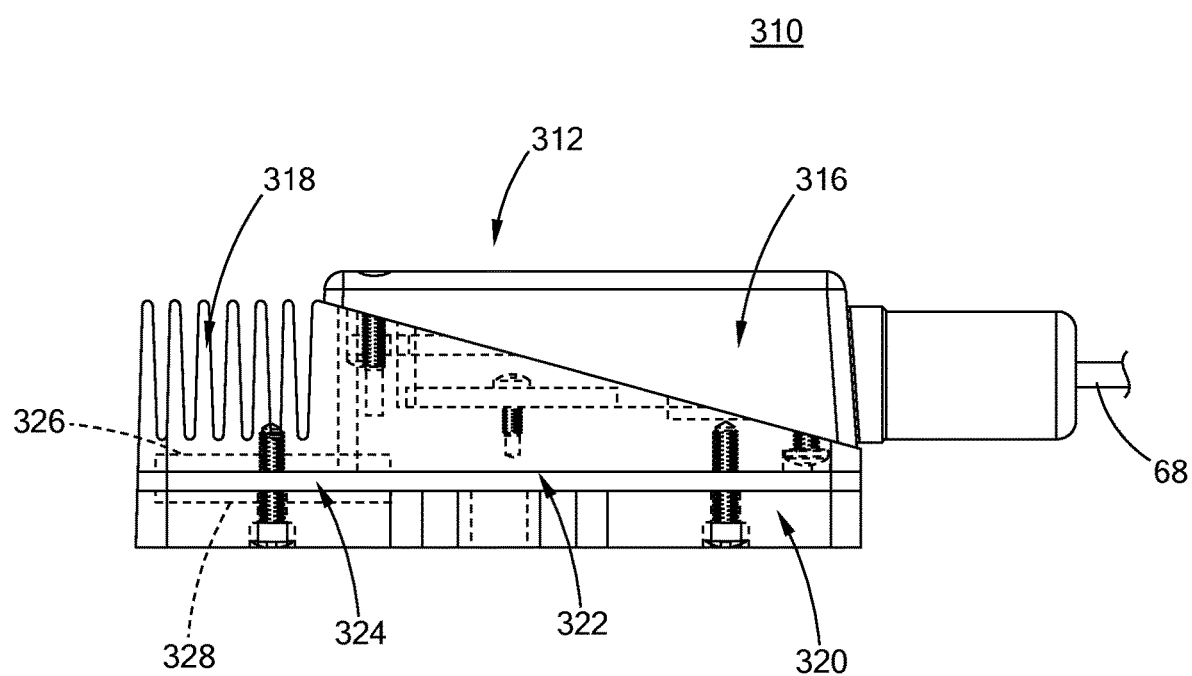
FIG. 18 is a partial, cross-sectional view of a wireless sensor assembly of the fourth form.

Referring to FIGS. 17 and 18, a wireless sensor assembly 310 in accordance with a fourth form of the present disclosure includes a housing 312 and a sensor 14 having a pair of wires 68. The housing 312 includes a top housing portion 316, a heat sink structure 318, and a lower base 320. The top housing portion 316 has a structure similar to the lower portion 32 of the first form, but is attached to the heat sink structure 318 in an inverted fashion. An insulation layer 322 is disposed between the heat sink structure 318 and the lower base 320. The lower base 320 defines a pair of tabs 321 for mounting the housing 312 to an adjacent mounting structure.

In this form, the wireless sensor assembly 310 does not include a battery. Instead, the electrical and electronic components inside the housing 312 and the sensor 14 outside the housing 312 are self-powered, for example, by a thermoelectric generator (TEG) 324, which is disposed within the housing 312. The TEG 324, also called a Seebeck generator, is a solid state device that converts heat (temperature differences) directly into electrical energy through a phenomenon called the Seebeck effect. The TEG 324 includes a first metallic plate 326 adjacent to the heat sink structure 318 and disposed above the insulation layer 322, and a second metallic plate 328 disposed below the insulation layer 322. The insulation layer 322 separates the first and second metallic plates 326 and 328. Part of the heat generated from the electrical and electronics are conducted to the first metallic plate 326 and is dissipated away by the heat sink structure 318. Another part of the heat generated by the electrical and electronic components inside the housing 312 is conducted to the second metallic plate 328. A temperature difference occurs between the first and second metallic plates 326 and 328, thereby generating electricity to power the electrical and electronic components inside the housing 312 and the sensor 14 outside the housing 312.

Fifth Form

Figure 19:
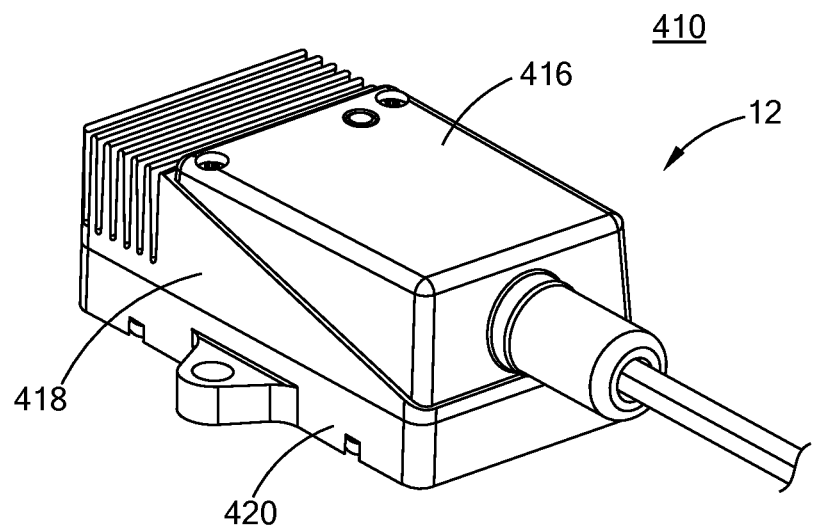
FIG. 19 is a perspective view of a wireless sensor assembly constructed in accordance with a fifth form of the present disclosure.
Figure 20:
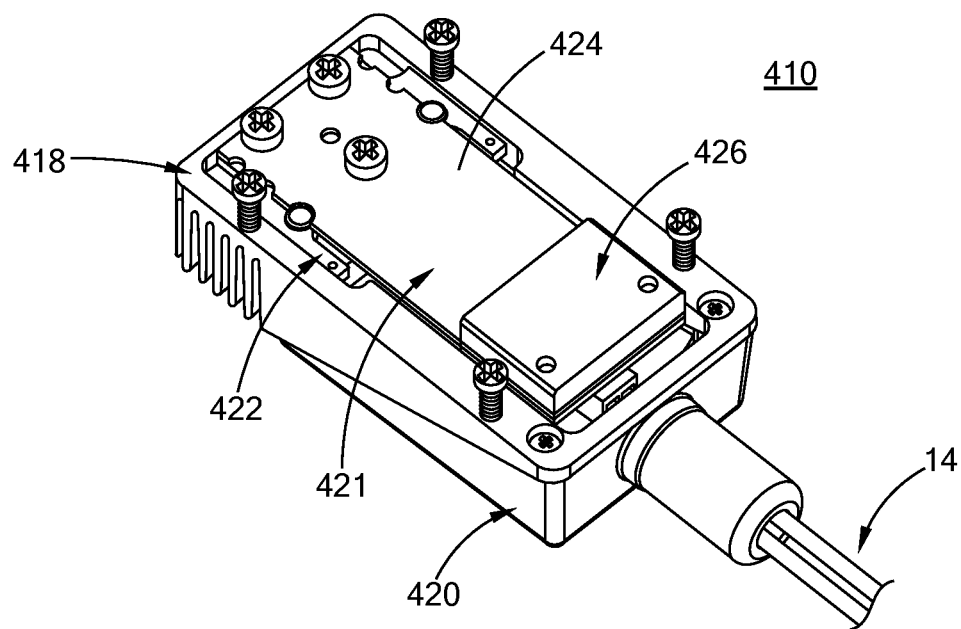
FIG. 20 is a perspective view of a wireless sensor assembly of the fifth form, with an upper portion removed to show components inside the housing.
Figure 21:
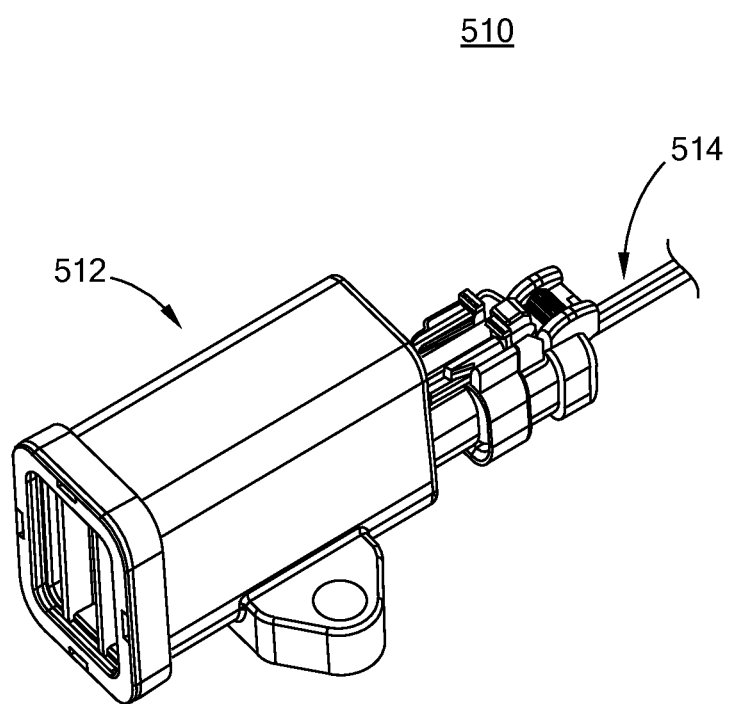
FIG. 21 is a perspective view of a wireless sensor assembly constructed in accordance with a sixth form of the present disclosure.
Figure 22:
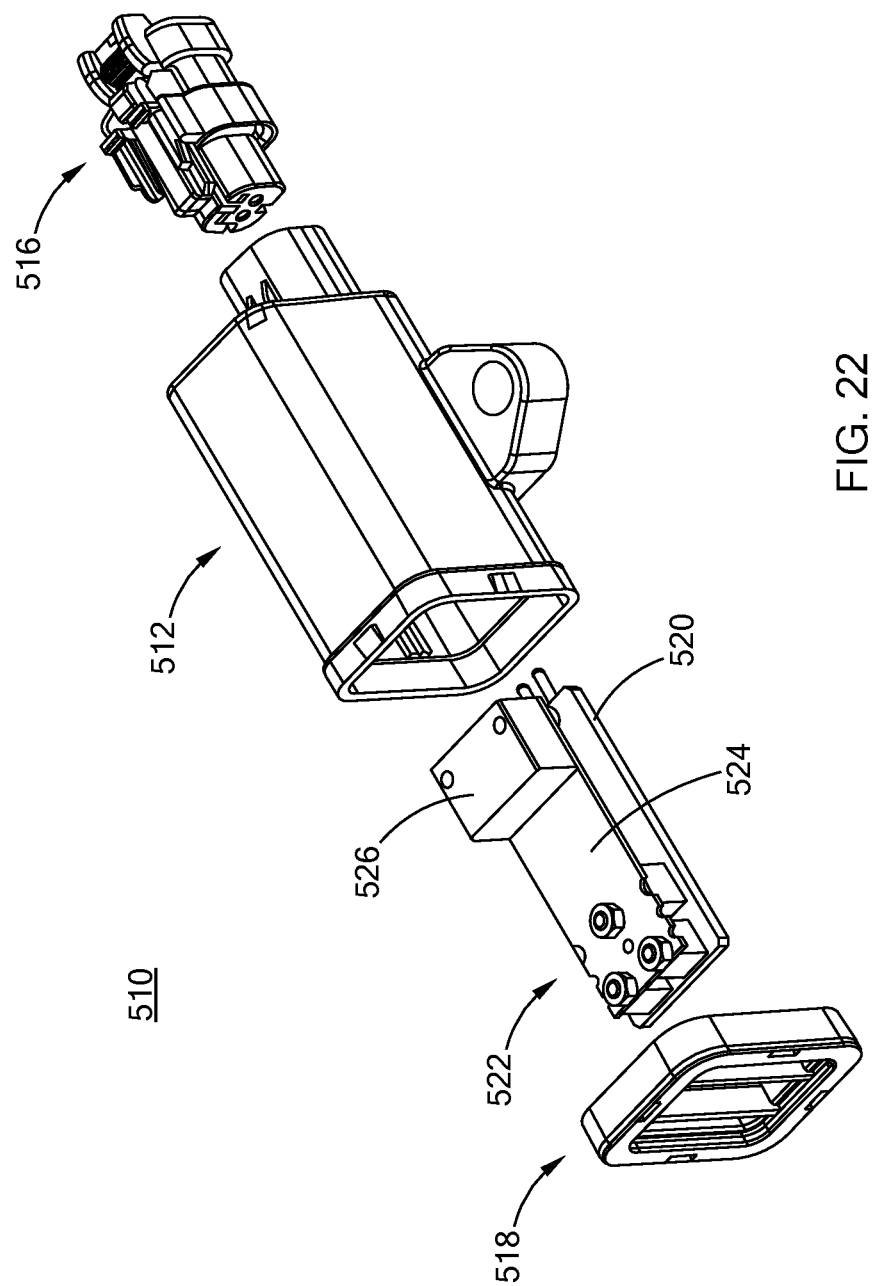
FIG. 22 is an exploded view of a wireless sensor assembly constructed in accordance with a sixth form of the present disclosure.
Figure 23:
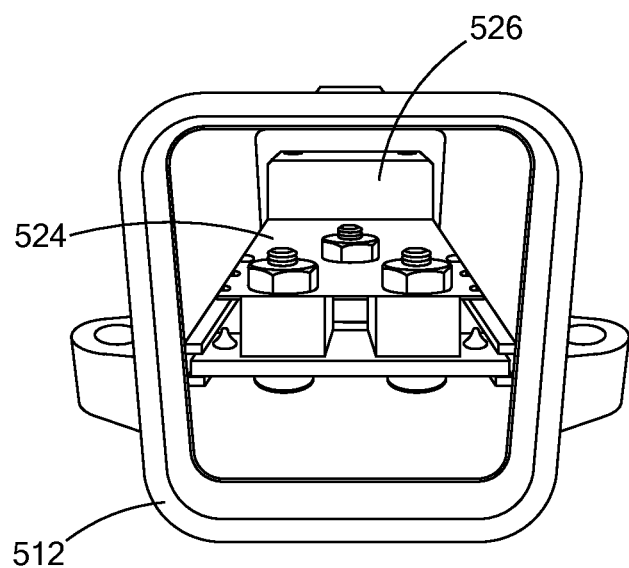
FIG. 23 is a front view of the wireless sensor assembly with a cap removed to show components inside the wireless sensor assembly of the sixth form.
Figure 24:
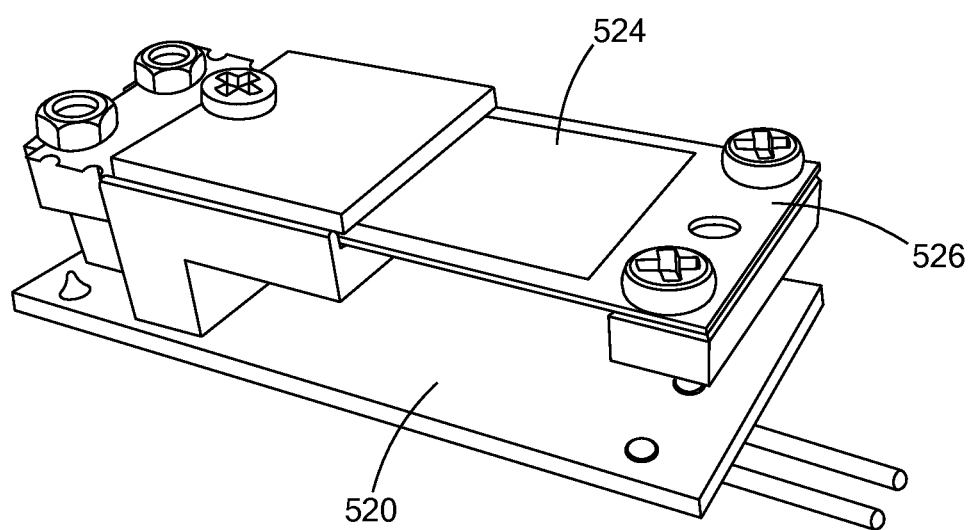
FIG. 24 is a perspective view of electrical and electronic components disposed inside the housing of the wireless sensor assembly of the sixth form.
Figure 25:
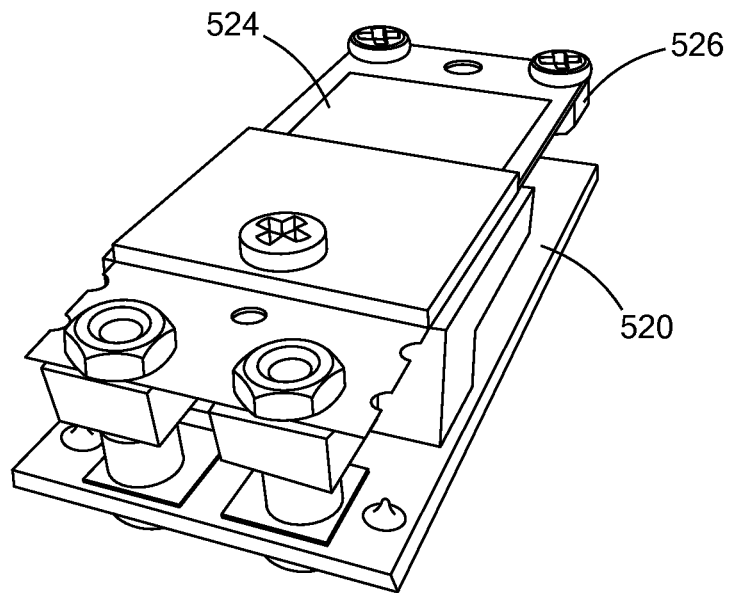
FIG. 25 is another perspective view of the electrical and electronic components of FIG. 24.
Figure 26:
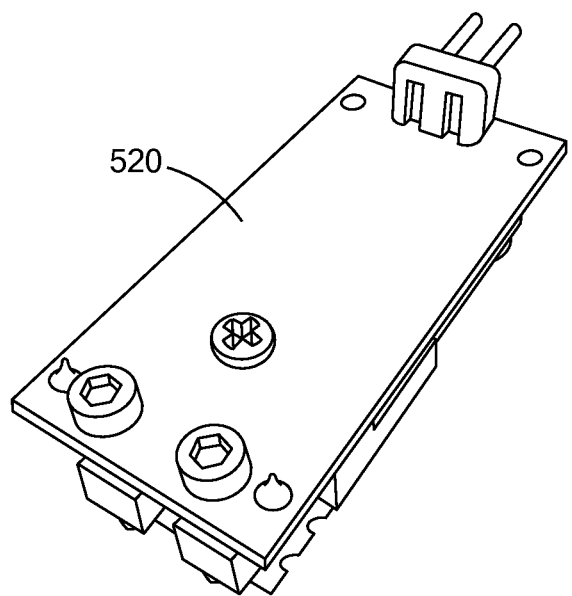
FIG. 26 is a bottom perspective view of the electrical and electronic components of FIG. 24.

Referring to FIGS. 19 and 20, a wireless sensor assembly 410 constructed in accordance with a fifth form of the present disclosure has a structure similar to that of the fourth form, differing only in the self-powering device. In this form, the self-powering device is a piezoelectric generator (PEG) 421, which converts mechanical strain into electrical current or voltage to power the electrical and electronic components inside the housing and the sensor 14 outside the housing. The strain can come from many different sources, such as human motion, low-frequency seismic vibrations, and acoustic noises. In the present form, the PEG 421 includes a power transfer printed circuit board (PCB) 422, a metallic plate 424, and a weight 426 attached to an end of the metallic plate 424. The metallic plate 424 functions as a cantilevered board with the weight 426 disposed at the end to cause mechanical strain in the metallic plate 424. The mechanical strain generated in the metallic plate 424 is converted into power/electricity, which is routed to the communications board (not shown in FIG. 20) via the power transfer PCB 422. The power transfer PCB 422 is clamped between the heat sink structure 318 and the metallic plate 424. Like the housing 312 in the fourth form, the housing 412 of the present form includes a top housing portion 416, a heat sink structure 418, and a lower base 420. The heat sink structure 418 in this form, however, only functions as a mounting structure for the sensor 14 and the PEG 421 because heat has no effect in generating electricity. Therefore, no insulation layer is provided between the heat sink structure 418 and the lower base 420.

The weight 426 that is attached to the metallic plate 424 for causing mechanical strain in the metallic plate 424 may be varied and properly selected to create a resonance in the PEG 421 at calculated frequencies to increase the vibration and the mechanical strain in the metallic plate 424, thereby increasing the electricity being generated therefrom.

Sixth Form

Referring to FIGS. 21 to 26, a wireless sensor assembly 510 constructed in accordance with a sixth form of the present disclosure may include a housing 512 and a sensor (not shown) that is connected to the electrical and electronic components inside the housing 512 by wires 514. The housing 512 has a rectangular configuration. The wireless sensor assembly 510 further includes a sensor connector 516 disposed at an end of the housing 512, and a cap 518 disposed at another end of the housing 512. As in wireless sensor assembly 410 of the sixth form, the wireless sensor assembly 510 includes electrical and electronic components disposed inside the housing 512. The electrical and electronic components may include a communication board 520, a self-powering device in the form of a piezoelectric generator (PEG) 522. The PEG 522 may include a metallic plate 524, and a weight 526 attached to an end of the metallic plate 524. The metallic plate 524 functions as a cantilevered board with the weight 526 disposed at the end to cause mechanical strain in the metallic plate 524. The mechanical strain generated in the metallic plate 524 is converted into power/electricity, which is routed to the communications board 520 to power the sensor and other electrical/electronic components.

In any of the forms described herein, the raw sensing data acquired by the sensors 14 can be transmitted to an external computing device, such as a laptop, smartphone or tablet, so that processing of the raw sensing data can occur externally. The wireless sensor assemblies have the advantages of reducing power consumption since raw sensing data are processed externally. In addition, since the processing and calculations of the data are performed on an external or remote device, a more complete high-resolution look-up table may be used on the external or remote device to increase accuracy, as opposed to a less accurate polynomial curve fitting that is stored in a smaller ROM due to limited space available for the ROM in the sensor.

Further, the wireless sensor assemblies have the advantages of allowing for update on the calibration curves and the look-up tables without the need to change the circuitry of the sensors. Field replacement sensors are assigned with identification (ID) information or code, such as an RFID tag or a barcode. During installation or replacement of the wireless sensor assembly, calibration information of the sensor 14 can be accessed through an external device in wireless communication with the wireless sensor assembly. By scanning or entering the ID information, the sensor 14 will be linked to a predetermined calibration curve via a network connection. In addition, the look-up table or calibration information can be periodically updated to account for drifts, thereby increasing measurement accuracy of the sensor 14 over the life of the sensor 14.

In one form of the wireless sensor assemblies as disclosed herein, the dimensions of the housing are approximately 1.75 in. L×1.25 in. W×0.68 in. H. When a battery is used, the housing may be larger. Due to the low power consumption of the Bluetooth component as the wireless component, which is less than 0.170 μW in one form of the present disclosure, the sensor 14 can be operated for at least 2 years with a selected battery while transmitting data every second. The low power consumption also makes self-powering possible. Moreover, in any of the wireless sensor assemblies described herein, the communications board can detect the amount of stored or generated energy and allow the sensor to automatically adjust the rate of transmitting the raw sensing data based on the amount of power available or predicted to be available.

The wireless sensor assembly according to any of the forms may be a digital sensing product that can transmit digital raw data to an external device or a remote device. The wireless sensor assembly includes interchangeable pieces to allow for easy assembly into multiple configurations, thus providing a "modular" construction. Each of the wireless sensor assemblies described herein can be varied to provide wired or wireless connectivity, and varied mounting and sensor input options.

While the wireless sensor assembly in any of the forms has been described to include only one sensor 14, more than one sensors may be connected to the electrical and electronics components inside the housing without departing from the scope of the present disclosure. For example, two or more sensors 14 may be inserted into the first aperture 22 and mounted by the mounting assembly 36 as shown in FIG. 6 and connected to the communication board 60 by two sensor connectors 66.

Seventh Form

A low-power wireless sensor system constructed in accordance with a seventh form of the present disclosure may include a plurality of wireless sensor assemblies, and a wireless network operatively connecting each of the wireless sensor assemblies and operable to transmit and receive data between each of the wireless sensor assemblies. The wireless sensor assemblies may be in the form of any of the wireless sensor assemblies described in the first to sixth forms and may communicate among themselves or with an external device, such as a tablet, a smartphone or a personal computer.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A sensor assembly comprising:
a power source configured to store and output electrical power, wherein the power source includes a self-powering device;
a wireless communication component configured to receive electrical power from the power source;
a sensor; and
a microprocessor electrically coupled to the power source and communicably coupled to the wireless communication component and the sensor, wherein the microprocessor is configured to receive a startup command, and in response to receiving the startup command, the microprocessor is configured to:
measure an amount of electrical power stored by the power source to determine whether the amount of electrical power is sufficient to complete the startup command;
receive an electrical power output from the power source during a first time period in response to the amount of electrical power being sufficient to complete the startup command; and
receive the electrical power output from the power source during a second time period in response to the amount of electrical power being insufficient to complete the startup command, wherein the second time period is greater than the first time period.

2. The sensor assembly of claim 1, wherein the microprocessor is configured to, in response to one of the first time period and the second time period elapsing:
obtain data from the sensor; and
transmit, using the wireless communication component, the data obtained from the sensor to an external device at a given transmittal rate, wherein the given transmittal rate is based on the amount of electrical power stored in the power source.

3. The sensor assembly of claim 2, wherein the given transmittal rate is based on a clock of the microprocessor.

4. The sensor assembly of claim 1, wherein receiving the electrical power output from the power source during the second time period further comprises:
receiving the electrical power output from the power source in response to a delay time period elapsing.

5. The sensor assembly of claim 4, wherein the delay time period is controlled by at least one of the microprocessor and an external delay element.

6. The sensor assembly of claim 1, wherein the sensor is at least one of a temperature sensor, a pressure sensor, a gas sensor, and an optical sensor.

7. The sensor assembly of claim 1, wherein the self-powering device is one of a thermoelectric device or a vibration device.

8. The sensor assembly of claim 1, wherein the wireless communication component includes one of a Bluetooth module, a WiFi module, and a LiFi module.

9. The sensor assembly of claim 1 further comprising a housing, wherein the power source, wireless communication component, and the microprocessor are disposed within the housing.

10. The sensor assembly of claim 9, wherein the housing defines a volume of less than 2 in$^3$.

11. A low-power wireless sensor system comprising:
a plurality of sensor assemblies according to claim 1; and
a wireless network operatively connecting each of the sensor assemblies and configured to transmit and receive data between each of the sensor assemblies.

12. A method for operating a sensor assembly having a power source, a wireless communication component, a sensor, and a microprocessor, the method comprising:

measuring an amount of electrical power stored by the power source, wherein the power source includes a self-powering device;

determining whether the amount of electrical power is sufficient to complete a startup command;

receiving the electrical power from the power source during a first time period in response to the amount of electrical power being sufficient to complete the startup command; and receiving the electrical power from the power source during a second time period in response to the amount of electrical power being insufficient to complete the startup command, wherein the second time period is greater than the first time period.

13. The method of claim 12, wherein in response to one of the first time period and the second time period elapsing, the method further comprises:

obtaining data from the sensor; and transmitting the data obtained from the sensor to an external device at a given transmittal rate, wherein the given transmittal rate is based on the amount of electrical power stored in the power source.

14. The method of claim 13, wherein the given transmittal rate is based on a clock of the microprocessor.

15. The method of claim 12, wherein receiving the electrical power from the power source during the second time period further comprises:

receiving the electrical power output by the power source in response to a delay time period elapsing.

16. The method of claim 15, further comprising controlling the delay time period using at least one of the microprocessor and an external delay element.

17. A sensor assembly comprising:

a power source configured to store and output electrical power, wherein the power source includes a self-powering device;

a wireless communication component configured to transmit data to an external device and receive power from the power source, wherein the wireless communication component has a power consumption of less than or equal to 0.5 mW;

a sensor;

a microprocessor electrically coupled to the power source, the wireless communication component, and the sensor, wherein the microprocessor is configured to receive a startup command, and in response to receiving the startup command, the microprocessor is configured to:

measure an amount of electrical power stored by the power source to determine whether the amount of electrical power is sufficient to complete the startup command;

receive the electrical power output by the power source during a first time period in response to the amount of electrical power being sufficient to complete the startup command;

receive the electrical power output by the power source during a second time period in response to the amount of electrical power being insufficient to complete the startup command, wherein the second time period is greater than the first time period; and in response to one of the first time period and the second time period elapsing, obtain data from the sensor and transmit the data to the external device at a given transmittal rate via the wireless communication component, wherein the given transmittal rate is based on amount of power stored in the power source; and a housing defining an interior space, wherein the power source, the wireless communication component, and the microprocessor are disposed within the interior space of the housing, and the housing defines a volume of less than 2 in$^3$.

18. The method of claim 12, wherein the self-powering device is one of a thermoelectric device or a vibration device.

19. The sensor assembly of claim 17, wherein the self-powering device is one of a thermoelectric device or a vibration device.

* * * * *